(12) United States Patent
Iwata

(10) Patent No.: US 9,105,122 B2
(45) Date of Patent: *Aug. 11, 2015

(54) IMAGE PROCESSING APPARATUS AND IMAGE PROCESSING METHOD

(71) Applicant: CANON KABUSHIKI KAISHA, Tokyo (JP)

(72) Inventor: Takuya Iwata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/302,893

(22) Filed: Jun. 12, 2014

(65) Prior Publication Data

US 2014/0292796 A1 Oct. 2, 2014

Related U.S. Application Data

(62) Division of application No. 13/968,528, filed on Aug. 16, 2013, now Pat. No. 8,781,249, which is a division of application No. 12/980,869, filed on Dec. 29, 2010, now Pat. No. 8,532,426.

(30) Foreign Application Priority Data

Jan. 6, 2010 (JP) ................................ 2010-001310
Sep. 30, 2010 (JP) ................................ 2010-221459

(51) Int. Cl.
*G06K 9/40* (2006.01)
*G09G 5/02* (2006.01)
*G06T 11/00* (2006.01)
*G06T 5/00* (2006.01)
*G06T 5/40* (2006.01)
*H04N 5/202* (2006.01)

(52) U.S. Cl.
CPC .............. *G06T 11/001* (2013.01); *G06T 5/008* (2013.01); *G06T 5/40* (2013.01); *H04N 5/202* (2013.01); *G06T 2207/10024* (2013.01); *G06T 2207/20021* (2013.01); *G06T 2207/30201* (2013.01)

(58) Field of Classification Search
CPC ........... G06T 5/008; G06T 5/40; G06T 5/003; G06T 11/001; G06T 2207/20021; G06T 2207/30201; H04N 5/202
USPC ................. 382/167, 173, 274, 275, 305, 312; 345/589; 348/254
See application file for complete search history.

(56) References Cited

U.S. PATENT DOCUMENTS

| 8,223,410 | B2* | 7/2012 | Wakazono et al. ........... 358/518 |
| 8,411,326 | B2* | 4/2013 | Inoue ........................... 358/3.23 |
| 2004/0012815 | A1* | 1/2004 | Fuchigami ..................... 358/2.1 |
| 2010/0278423 | A1* | 11/2010 | Itoh et al. ...................... 382/169 |
| 2013/0084026 | A1 | 4/2013 | Kigure | |

* cited by examiner

*Primary Examiner* — Kanjibhai Patel
(74) *Attorney, Agent, or Firm* — Cowan, Liebowitz & Latman, P.C.

(57) ABSTRACT

In an image processing performing local tone correction on an image, tone correction on an object (face) area can be suppressed from becoming nonuniform. The apparatus is provided with an acquisition unit (102) that acquires coordinate information on an object area, a division unit (103) that divides the inputted image into a plurality of divided areas, a first decision unit (105) that decides atone correction coefficient for each of the divided areas, a second decision unit (106) that decides a tone correction coefficient for the object area based on coordinate information on the object area and the tone correction coefficients for the plurality of divided areas, and an image processing unit (107) that performs tone correction processing on the object area by applying thereto the tone correction coefficient decided by the second decision unit in a uniform manner without depending on coordinates thereof.

26 Claims, 10 Drawing Sheets

IMAGE PROCESSING APPARATUS AND IMAGE PROCESSING METHOD

CROSS-REFERENCE TO RELATED APPLICATION

This application is a divisional of application Ser. No. 13/968,528, filed Aug. 16, 2013, which is a divisional of application Ser. No. 12/980,869, filed Dec. 29, 2010, now U.S. Pat. No. 8,532,426, the entire disclosures of which are hereby incorporated by reference.

BACKGROUND OF THE INVENTION

1. Field of the Invention

The present invention relates to an image processing apparatus and an image processing method of performing tone correction on a moving image or a still image being inputted.

2. Description of the Related Art

An area in which the face of a person is displayed (hereinafter, referred to as a "face area") in a moving image or a still image is an important area to which viewers pay particular attention. Therefore, with a photographing device such as a digital camera, etc., the detection of the face area is generally carried out.

On the other hand, with display equipment such as a television, etc., local tone correction is generally carried out for the purpose of enhancing contrast, reducing local extinction of tone in dark region and bright region, or the like. For example, there is cited processing such as one in which tone correction is carried out by dividing an image into a plurality of areas so as to obtain local statistical information (e.g., brightness information) of the image, and locally controlling a gamma curve that is used for tone correction, based on the statistical information thus obtained.

In the patent gazette of Japanese patent application laid-open No. 2009-59119, there is disclosed atone correction system in which an image is divided into a plurality of block areas in order to obtain a suitable tone for the face part of a person, and the brightness of an input image is corrected based on the brightness information of the plurality of block areas and the brightness information of the face part.

SUMMARY OF THE INVENTION

However, in the above-mentioned tone correction system, the tone correction is carried out based on the brightness information which is detected for each of the divided areas, and the brightness information of the face part, so tone correction, being uniform over the face part, has not necessarily been made. As a result, the tone correction of the face area, to which viewers pay attention, might become nonuniform, thus giving rise to a fear that an odd or uncomfortable feeling might be given to the viewers. For example, in cases where there exists a black object in the vicinity of the left side of the face part, the left side of the face might be influenced by the tone correction to the black object, so that tone correction might become nonuniform on the right side and the left side of the face.

Accordingly, an object of the present invention is to suppress tone correction to an area in which a specific kind of object such as the face of a person, etc., exists, from becoming nonuniform, in an image processing apparatus and an image processing method of performing local tone correction on an image.

The present invention in its first aspect provides an image processing apparatus which performs tone correction processing on an image inputted, the image processing apparatus comprising:

an acquisition unit that acquires coordinate information on an object area which is an area where a predetermined kind of object exists in the inputted image;

a division unit that divides the inputted image into a plurality of divided areas;

a first decision unit that decides a tone correction coefficient for each of the divided areas related to the tone correction processing based on brightness information of each of the plurality of divided areas;

a second decision unit that decides a tone correction coefficient related to tone correction processing on the object area based on coordinate information on the object area and tone correction coefficients for at least divided areas which have a common portion with the object area, among the plurality of divided areas; and an image processing unit that performs tone correction processing on the object area in the inputted image, by applying thereto the tone correction coefficient decided by the second decision unit in a uniform manner without depending on coordinates thereof, and that performs tone correction processing, in which weighted interpolation is carried out according to coordinates by the use of the tone correction coefficient for each of the divided areas decided by the first decision unit, on areas other than the object area in the inputted image.

The present invention in its second aspect provides an image processing method which performs tone correction processing on an image inputted, the image processing method comprising:

an acquisition step to acquire coordinate information on an object area which is an area where a predetermined kind of object exists in the inputted image;

a division step to divide the inputted image into a plurality of divided areas;

a first decision step to decide a tone correction coefficient for each of the divided areas related to the tone correction processing based on brightness information of each of the plurality of divided areas;

a second decision step to decide a tone correction coefficient related to tone correction processing on the object area based on coordinate information on the object area and tone correction coefficients for at least divided areas which have a common portion with the object area, among the plurality of divided areas; and an image processing step to perform tone correction processing on the object area in the inputted image by applying thereto the tone correction coefficient decided by the second decision step in a uniform manner without depending on coordinates thereof, and to perform tone correction processing, in which weighted interpolation is carried out according to coordinates by the use of the tone correction coefficient for each of the divided areas decided by the first decision step, on areas other than the object area in the inputted image.

According to the present invention, in an image processing apparatus and an image processing method of performing local tone correction on an image, it becomes possible to suppress tone correction on an area in which a specific kind of object such as the face of a person, etc., exists from becoming nonuniform.

Further features of the present invention will become apparent from the following description of exemplary embodiments with reference to the attached drawings.

DESCRIPTION OF THE EMBODIMENTS

First Embodiment

Figure 1:
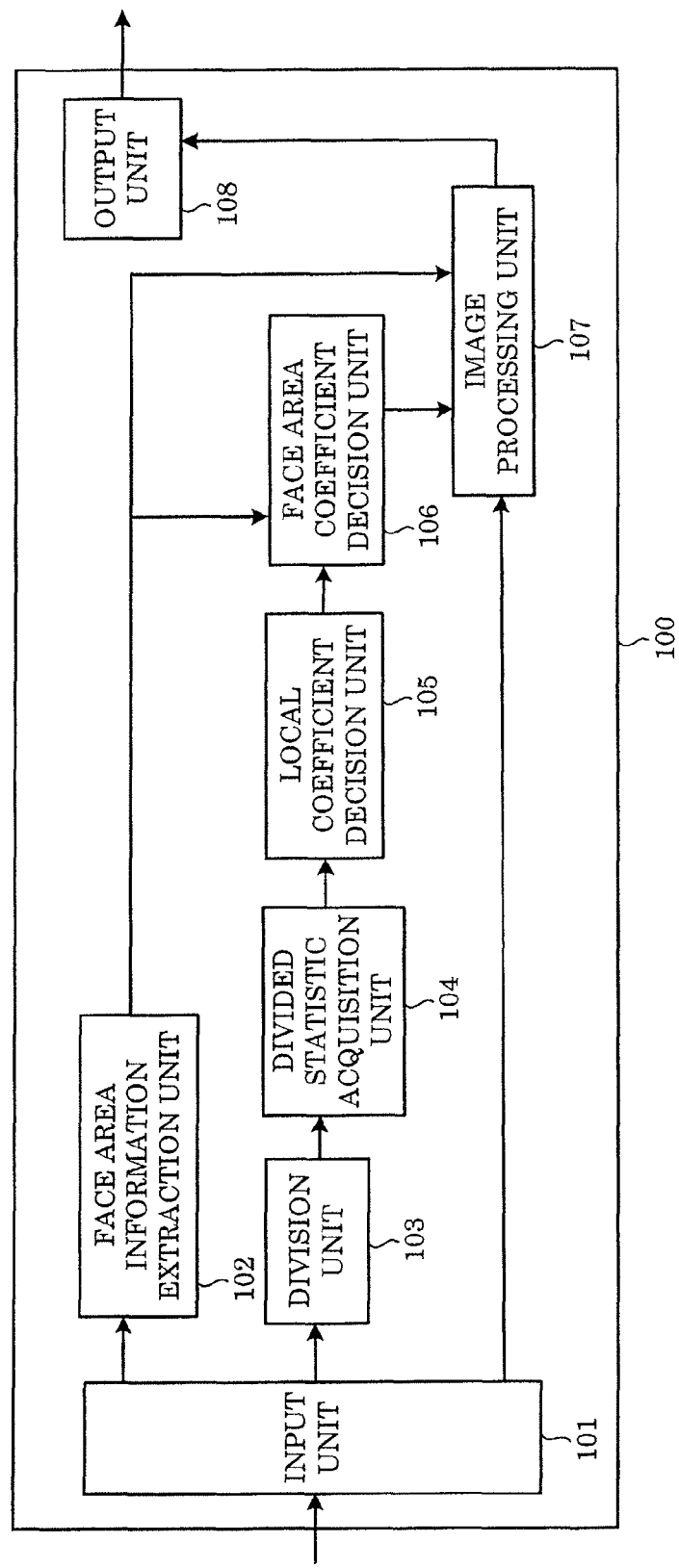
FIG. 1 is a block diagram of an image processing apparatus according to a first embodiment and a second embodiment.

FIG. 1 is a block diagram showing the construction of an image processing apparatus according to a first embodiment of the present invention. This image processing apparatus is an apparatus that outputs image data to which the result of detection of a face area by means of a device and/or a program that detects an area (face area) in which an image of the face of a person in an image exists is added as metadata, while performing tone correction thereon.

This image processing apparatus can be applied to photographing devices such as digital cameras, digital camcorders, etc., video display devices such as digital televisions, monitors, etc., and video output devices such as recorders, players, game machines, etc. Here, note that this embodiment is an example of a case in which "a predetermined kind of object" in the present invention is "the face of a person", and "a face area" in this embodiment corresponds to "an object area" in the present invention.

Image data, to which the result of detection of the face area carried out by means of a photographing device such as a digital camera, etc., has been added as metadata, is inputted to an input unit 101. Here, note that the metadata of the face area to be added is the information which can specify the coordinates of vertices of a rectangular area which indicates the existence of the face.

For example, they are the horizontal coordinate (x coordinate) and the vertical coordinate (y coordinate) of an upper left vertex of the rectangular area indicating the existence of the face, and the horizontal coordinate (x coordinate) and the vertical coordinate (y coordinate) of a lower right vertex thereof. Here, note that in this embodiment, description will be made by taking, as an example, the case where a face area is detected as a rectangular area including therein a face part inside an image, but the present invention can also be applied to an image in which a face area is detected in a shape other than a rectangular area.

A face area information extraction unit 102 extracts the coordinates of four vertices of the rectangular area in the form of the face area from the metadata of the image data inputted to the input unit 101. In addition, the center coordinates of the face area are calculated from the vertex coordinates of the face area thus extracted. The face area information extraction unit 102 outputs the extracted vertex coordinate information and the center coordinate information of the face area (information on the object area) to a face area coefficient decision unit 106 and an image processing unit 107. The face area information extraction unit 102 of this embodiment constitutes an "acquisition unit" of the present invention.

A division unit 103 spatially divides the image data inputted to the input unit 101 into a plurality of divided areas. A divisional statistic acquisition unit 104 calculates an average brightness value as brightness information for each of the divided areas. The average brightness value is calculated by adding the brightness values in each divided area in a cumulative manner, and by finally dividing the thus cumulatively added brightness values by the number of pixels in each divided area.

A local coefficient decision unit 105 decides a gamma curve, which is used at the time of carrying out tone correction of a pixel located at the center of each of the divided areas, from the corresponding average brightness value calculated by the divisional statistic acquisition unit 104. A tone correction coefficient for tone correction processing can be calculated based on the gamma curve thus obtained.

Here, note that the local coefficient decision unit 105 may decide a gamma curve, which is used at the time of carrying out the tone correction of the pixel located at the center of each of the divided areas, not based on the average or brightness value for each divided area, but based on a brightness histogram for each divided area. For example, a gamma curve capable of improving the tone characteristic (gradient) of an attention tone is determined by calculating a dark portion attention tone and a bright portion attention tone from the brightness histogram. In addition, a gamma curve used at the time of carrying out the tone correction of the pixel located at the center of each of the divided areas may instead be decided based on color information such as an R (red) histogram, a C (green) histogram, a B (blue) histogram, etc.

Figure 2:
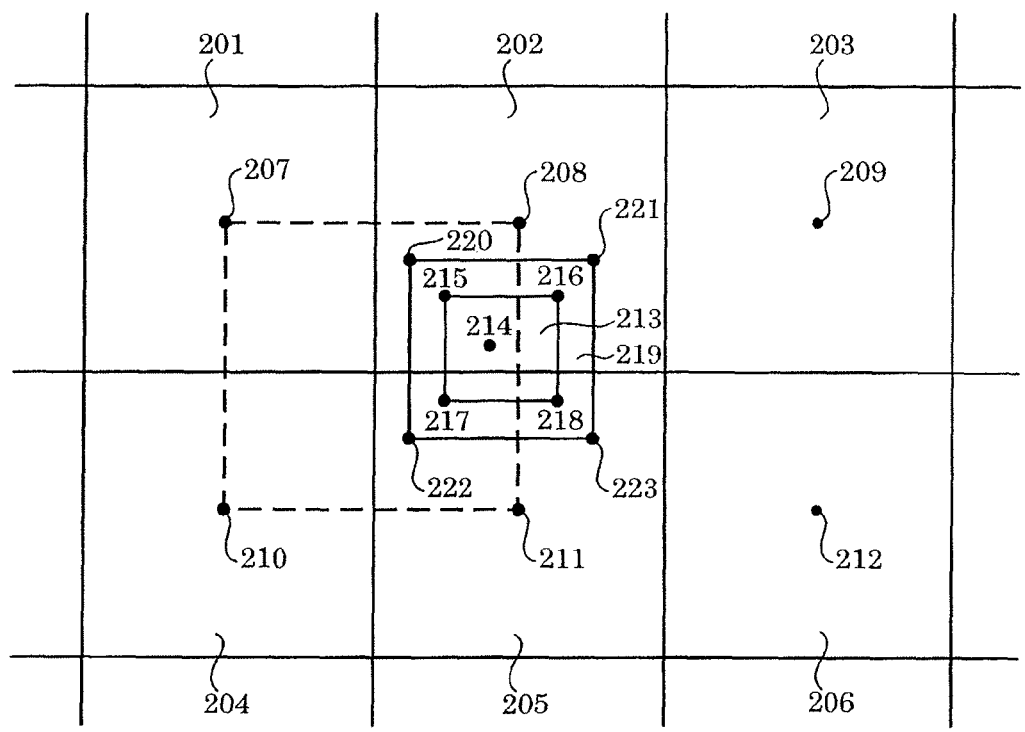
FIG. 2 is a view for explaining image processing on an image including a face area according to the first embodiment.

Here, description will be made to a decision method for gamma curves used at the time of carrying out the tone correction of the individual central pixels of the divided areas by means of the local coefficient decision unit 105, based on FIG. 2 and FIG. 3. FIG. 2 is a view in which six mutually adjacent divided areas 201 through 206 are extracted from an image divided by the division unit 103 as an example of divided areas having common portions with the face area and those divided areas which are located in the vicinity thereof.

In addition, the pixels located at the individual centers of the divided areas are denoted by central pixels 207 through 212, respectively, and the face area specified based on the coordinate information of the face area which is inputted from the face area information extraction unit 102 is denoted by a face area 213, and the pixel located at the center of the face area is denoted by a central pixel 214.

Moreover, the pixels which exist in the vertex positions of the face area 213 are denoted as face area vertex pixels 215 through 218, respectively, and an area of a predetermined range which touches the outer periphery of the face area 213 is denoted as a outer face area 219, and the pixels which exist in the vertex positions of the outer face area 219 are denoted as outer face area vertex pixels 220 through 223, respectively.

Figure 3:
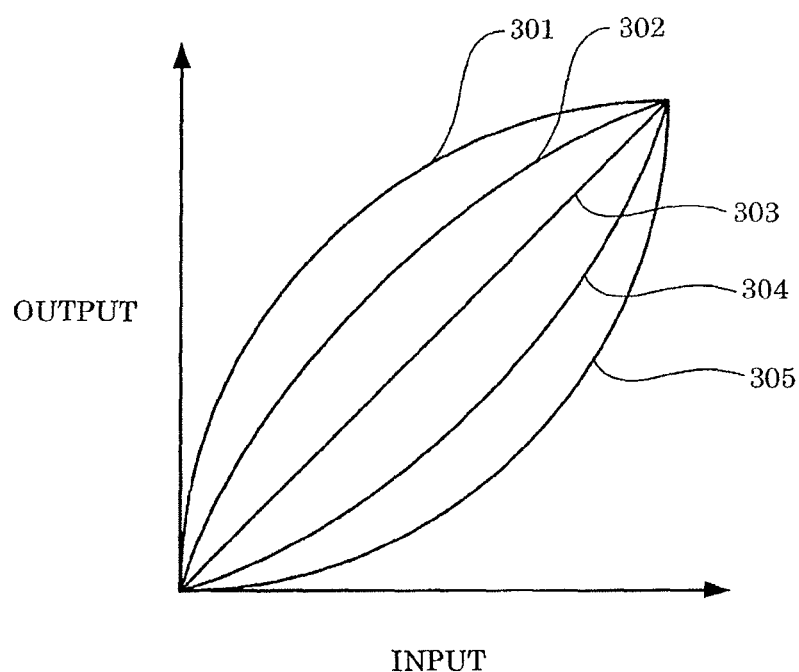
FIG. 3 is a view showing gamma curves according to average luminance or brightness values, used in the tone correction of the first embodiment.

In addition, FIG. 3 shows gamma curves 301 through 305 which are stored in a gamma curve storage unit (not shown). Here, note that the gamma curve 301 with a steep slope in an area where the input value is small is a gamma curve which is suitable at the time of assigning many tones to a low brightness input. On the other hand, the gamma curve 305 with a steep slope in an area where the input value is large is a gamma curve which is suitable at the time of assigning many tones to a high brightness input.

For example, the gamma curve 301 has a gamma coefficient k of 0.6; the gamma curve 302 has a gamma coefficient k of 0.8; the gamma curve 303 has a gamma coefficient k of 1; the gamma curve 304 has a gamma coefficient k of 1.2; and the gamma curve 305 has a gamma coefficient k of 1.4.

Here, the local coefficient decision unit 105 decides gamma curves used for the tone correction of the central pixels 207 through 212 of the divided areas by selecting them from the gamma curve storage unit (not shown) based on the average brightness values of the divided areas 201 through 206 calculated by the divisional statistic acquisition unit 104. The following is mentioned as an example of such a selection method.

That is, four thresholds with which a size relation of Th1<Th2<Th3<Th4 is satisfied are set as thresholds of the average brightness value, and in cases where the average brightness value is equal to or less than the threshold Th1, the gamma curve 301 is selected. In cases where the average brightness value is larger than Th1 and equal to or less than Th2, the gamma curve 302 is selected. In cases where the average brightness value is larger than Th2 and equal to or less than Th3, the gamma curve 303 is selected. In cases where the average brightness value is larger than Th3 and equal to or less than Th4, the gamma curve 304 is selected. In cases where the average brightness value is larger than Th4, the gamma curve 305 is selected.

In this embodiment, the local coefficient decision unit 105, which decides a gamma curve used in the central pixel of each of the divided areas based on the average brightness value of each divided area, constitutes "a first decision unit" of the present invention.

The face area coefficient decision unit 106 decides a gamma curve, which is used at the time of carrying out the tone correction of the central pixel 214 of the face area and the outer face area vertex pixels 220 through 223. This processing is carried out based on the gamma curves, which are used in the central pixels 207 through 212 of the divided areas and which have been decided by the local coefficient decision unit 105, and the vertex coordinate information and the center coordinate information of the face area, which are inputted from the face area information extraction unit 102.

First, specific reference will be made to a method of deciding the gamma curve used in the central pixel 214 of the face area. The central pixel 214 of the face area exists in the rectangular area which has vertices at the central pixels 207, 208, 210, 211 of the divided areas.

Accordingly, the face area coefficient decision unit 106 determines a gamma curve used for the tone correction of the central pixel 214 of the face area by carrying out the weighted interpolation of the gamma curves used for tone correction in each of the central pixels 207, 208, 210, 211 of the divided areas. This weighted interpolation is a weighted interpolation according to the distance of the central pixel 214 of the face area to each of the central pixels 207, 208, 210, 211 of the divided areas.

That is, the gamma curve used for the tone correction of the central pixel 214 of the face area is decided based on the information of the face area, and the gamma curves of two divided areas which have a common portion with the face area, and of two divided areas which are adjacent to these areas, among the divided areas. Specifically, such a decision is made based on the gamma curves used for tone correction in the central pixels 208, 211 of the two divided areas, among the divided areas, which have a common portion with the face area, and the gamma curves used for tone correction in the central pixels 207, 210 of the two divided areas contiguous to the above-mentioned two divided areas.

In this embodiment, the face area coefficient decision unit 106, which decides a gamma curve used for the tone correction of the central pixel 214 of the face area, constitutes "a second decision unit" of the present invention.

Next, specific reference will be made to a method of deciding the gamma curves used in the outer face area vertex pixels 220 through 223. The outer face area vertex pixels 220, 222 exist in the rectangular area which has vertices at the central pixels 207, 208, 210, 211 of the divided areas.

Accordingly, the face area coefficient decision unit 106 determines gamma curves used for the tone correction of the outer face area vertex pixels 220, 222 by carrying out the weighted interpolation of the gamma curves used for tone correction in each of the central pixels 207, 208, 210, 211 of the divided areas. This weighted interpolation is a weighted interpolation according to the distance of each of the outer face area vertex pixels 220, 222 to each of the central pixels 207, 208, 210, 211 of the divided areas.

Similarly, the face area coefficient decision unit 106 determines gamma curves used for the tone correction of the outer face area vertex pixels 221, 223 by carrying out the weighted interpolation of the gamma curves used for tone correction in each of the central pixels 208, 209, 211, 212 of the divided areas. This weighted interpolation is a weighted interpolation according to the distance of each of the outer face area vertex pixels 221, 223 to each of the central pixels 208, 209, 211, 212 of the divided areas.

According to the processing of the local coefficient decision unit 105 and the face area coefficient decision unit 106 as referred to above, gamma curves, which are image processing coefficients (tone correction coefficients) used for the tone correction of the central pixels 207 through 212 of the divided areas, the central pixel 214 of the face area, and the outer face area vertex pixels 220 through 223, are decided.

The image processing unit 107 carries out image processing (tone correction) on the image outputted from the input unit 101 based on the image processing coefficients decided by the local coefficient decision unit 105 and the face area coefficient decision unit 106, and the vertex coordinates of the face area inputted from the face area information extraction unit 102.

Figure 4:
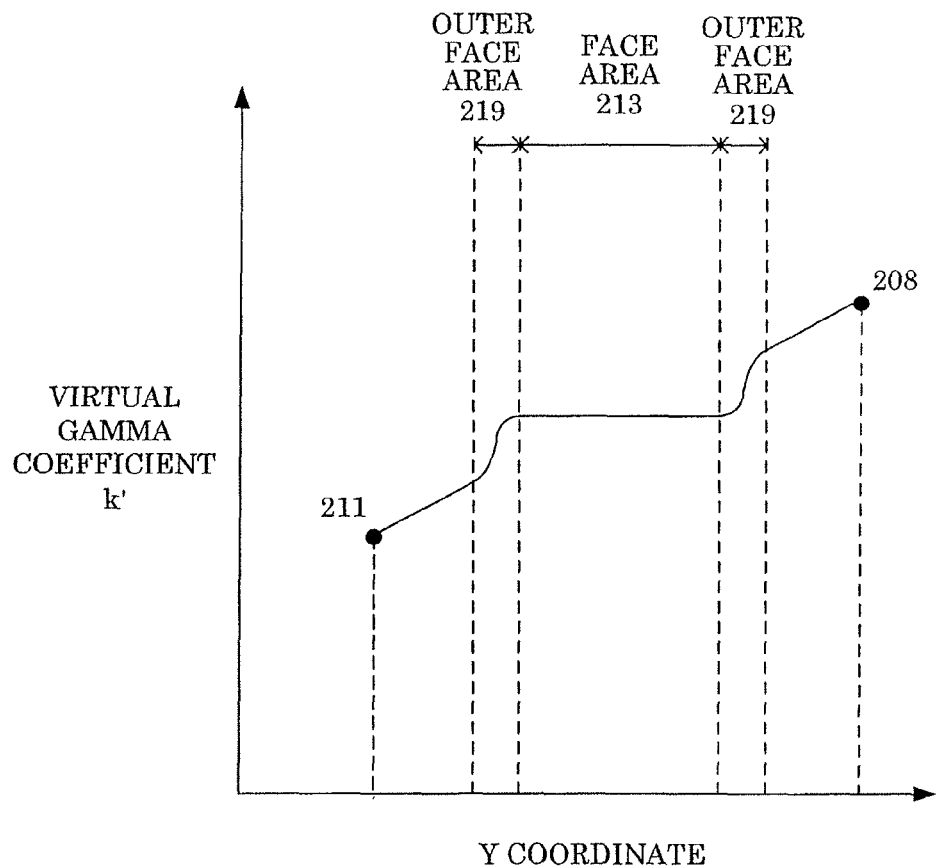
FIG. 4 is a view showing a virtual gamma coefficient k'.

In the following, by using FIG. 2 and FIG. 4, reference will be made to the image processing carried out by the image processing unit 107 in a sequential manner while dividing it into three parts including the face area 213, areas outside of the outer face area 219, and the outer face area 219. FIG. 4 is a view showing a virtual gamma coefficient k' of pixels located on a line which connects between the pixel 208 and the pixel 211 of FIG. 2.

First, image processing in the face area 213 will be explained. The image processing unit 107 carries out image processing on all the pixels contained in the face area 213 by the use of a common image processing coefficient in order to make the image processing of the face area 213 uniform.

Specifically, the image processing unit 107 carries out gamma conversion by uniformly applying the gamma curve to be used for the tone correction of the central pixel 214 of the face area, which has been decided by the face area coefficient decision unit 106, to all the pixels contained in the face area 213 without depending on the coordinates of the pixels. As a result of this, the image processing of the face area, to which viewers pay attention, becomes uniform, so it becomes possible to reduce the possibility of giving an odd or uncomfortable feeling to the viewers.

Then, the image processing in the areas outside of the outer face area 219 will be explained. The image processing unit 107 carries out image processing on individual pixels in the areas outside of the outer face area 219 by the use of local gamma curves for obtaining the effect of enhancing contrast or reducing local extinction of tone in dark region and bright region.

Specifically, in the tone correction processing which is made on each pixel which exists in the outside of the outer face area 219 and in the rectangular area having its vertices at the central pixels 207, 208, 210, 211, the image processing unit 107 performs the following processing. That is, the image processing unit 107 first carries out gamma conversion on each pixel by the use of the gamma curves used for the respective tone correction of the central pixels 207, 208, 210, 211 of the individual divided areas.

Then, the image processing unit 107 performs the weighted sum averaging of the results of the above-mentioned gamma conversion carried out by use of the gamma curves used for the respective tone correction of the central pixels of the individual divided areas to those pixels which are to be processed or subjected to tone correction processing, according to the coordinates of the pixels to be processed. Specifically, the image processing unit 107 carries out weighted sum averaging processing of the results of the gamma conversion according to the distances from the pixels to be processed to each of the central pixels 207, 208, 210, 211 of the individual divided areas, and outputs this (the weighted sum average thus obtained) as an image processing result (Lone correction processing result) of the pixels to be processed.

Alternatively, the tone correction processing, which is made on each pixel outside of the outer face area 219 and inside of the rectangular area having its vertices at the central pixels 207, 208, 210, 211, may be carried out as follows. First, the weighted sum averaging of the gamma coefficients used for the tone correction of the central pixels 207, 208, 210, 211 is carried out according to the distances from the pixels to be processed in the tone correction processing to each of the central pixels 207, 208, 210, 211. This (the weighted sum average thus obtained) is used as a gamma coefficient k' (this being called a virtual gamma coefficient) which is used for the tone correction of the pixels to be processed.

Subsequently, gamma conversion is carried out on the pixels to be processed which exist inside of the rectangular area having its vertices at the central pixels 207, 208, 210, 211, by the use of the virtual gamma coefficient k', and this (the result of the gamma conversion) is outputted as an image processing result (a tone correction processing result). The processing as mentioned above corresponds to "tone correction processing in which weighted interpolation is carried out according to coordinates, by the use of a tone correction coefficient for each of divided areas" of the present invention.

Similarly, in the tone correction processing which is made on each pixel which exists in the outside of the outer face area 219 and inside of a rectangular area having its vertices at the central pixels 208, 209, 211, 212, the image processing unit 107 performs the following processing. That is, the image processing unit 107 first carries out gamma conversion on each pixel by the use of the gamma curves used for the tone correction of the individual central pixels 208, 209, 211, 212 of the individual divided areas.

Then, the image processing unit 107 performs the weighted sum averaging of the results of the above-mentioned gamma conversion carried out by use of the gamma curves used for the tone correction of the central pixels of the individual divided areas to those pixels which are to be processed or subjected to tone correction processing, according to the coordinates of the pixels to be processed. Specifically, the image processing unit 107 carries out weighted sum averaging processing of the results of the gamma conversion according to the distances from the pixels to be processed to each of the central pixels 208, 209, 211, 212 of the individual divided areas, and outputs this (the weighted sum average thus obtained) as an image processing result (tone correction processing result) of the pixels to be processed.

Alternatively, the weighted sum averaging of the gamma coefficients used for the tone correction of the central pixels 208, 209, 211, 212 is carried out according to the distances from the pixels to be processed in the tone correction processing to each of the central pixels 208, 209, 211, 212. This (the weighted sum average thus obtained) is used as a gamma coefficient k' (a virtual gamma coefficient) which is used for the tone correction of the pixels to be processed.

Subsequently, gamma conversion may be carried out on the pixels to be processed which exist inside of the rectangular area having its vertices at the central pixels 208, 209, 211, 212, by the use of the virtual gamma coefficient k', and this (the result of the gamma conversion) may be outputted as an image processing result (a tone correction processing result).

In addition, with respect to the pixels in an area outside of a rectangular area having its vertices at the central pixels 207, 209, 210, 212, the image processing unit 107 carries out the same image processing as mentioned above by using the central pixels (not shown) of divided areas which exist outside of the divided areas 201 through 206 shown in FIG. 2.

That is, in the tone correction processing on individual pixels in the areas outside of the outer face area 219 as pixels to be processed, the gamma curves used for the tone correction of the central pixels of the individual divided areas decided by the local coefficient decision unit 105 are applied with weights being attached thereto according to the coordinates of the pixels to be processed, respectively.

Thus, in this embodiment, the image processing unit 107 carries out weighted summation of the individual gamma curves used for the tone correction of the central pixels of the individual divided areas which have been decided by the local coefficient decision unit 105, while weighting them according to the coordinates of the pixels to be processed. With this, a tone correction coefficient for each pixel in areas other than the face area will be decided as a result thereof. Accordingly, in this embodiment, the image processing unit 107, which performs such weighted sum processing, can also be said as constituting "the first decision unit" of the present invention.

As described above, in the areas outside of the outer face area 219, it becomes possible to enhance contrast or to reduce local extinction of tone in dark region and/or local extinction of tone in bright region by performing image processing with reference to the gamma curves decided based on the average brightness value or the brightness histogram of the divided areas.

Here, the areas outside of the outer face area 219 constitute "an area other than the object area" in the present invention. The outer face area 219 also constitutes "an area other than the object area", but in this embodiment, still more detailed tone correction processing is carried out on the outer face area 219, as will be described later.

Next, image processing in the outer face area 219 will be explained. As mentioned above, in the face area 213, a tone correction coefficient applied to each pixel in that area is decided with reference to a common gamma curve. In addition, in the areas outside of the outer face area 219, a tone correction coefficient applied to each pixel in that area is decided with reference to the gamma curves used in the tone correction of the central pixels 207 through 212.

The outer face area 219 is an area for changing the tone correction coefficient related to image processing in a gradual manner while preventing the tone correction coefficient from changing in a rapid manner, in a boundary between the face area 213 and the areas outside of the outer face area 219.

Specifically, in the tone correction processing which is made on those pixels, as the pixels to be processed, which are included in a quadrilateral area having its vertices at the face area vertex pixels 215, 216 and the outer face area vertex pixels 220, 221, the image processing unit 107 performs the following processing. That is, the image processing unit 107 first carries out gamma conversion on the pixels to be processed with reference to the gamma curves used for the tone correction of the pixels at the positions of the vertices 215, 216, 220, 221.

Then, the image processing unit 107 performs the weighted sum averaging of the results of the above-mentioned gamma conversion carried out by applying the gamma curves used for the tone correction of the individual vertices 215, 216, 220, 221 to those pixels which are to be processed or subjected to tone correction processing, according to the distances of the pixels to be processed to the vertices 215, 216, 220, 221, respectively. This (weighted sum average thus obtained) is outputted as an image processing result (tone correction processing result) of the pixels to be processed.

Alternatively, the tone correction processing, which is made on those pixels, as the pixels to be processed, which are included in the quadrilateral area having its vertices at the face area vertex pixels 215, 216 and the outer face area vertex pixels 220, 221, may be carried out in the following manner. First, the weighted sum averaging of the gamma coefficients used for the tone correction of the vertices 215, 216, 220, 221 is carried out according to the distances from the pixels to be processed in the tone correction processing to the vertices 215, 216, 220, 221, respectively. This (the weighted sum average thus obtained) is used as a gamma coefficient k' (a virtual gamma coefficient) which is used for the tone correction of the pixels to be processed.

Subsequently, gamma conversion is carried out on those pixels to be processed which are included in the quadrilateral area having its vertices at the vertices 215, 216, 220, 221, by the use of the virtual gamma coefficient k', and this (the result of the gamma conversion) is outputted as an image processing result (a tone correction processing result).

Here, note that the gamma curves used for the tone correction of the face area vertex pixels 215, 216 are equal to the gamma curve used for the tone correction of the central pixel 214 of the face area, as mentioned above. In addition, the gamma curves used for the tone correction of the outer face area vertex pixels 220, 221 are those which have been decided by the face area coefficient decision unit 106.

The tone correction of the pixels in a quadrilateral area surrounded by the face area vertex pixels 216, 218 and the outer face area vertex pixels 221, 223, and the tone correction of the pixels in a quadrilateral area surrounded by the face area vertex pixels 217, 218 and the outer face area vertex pixels 222, 223 are carried out in a similar manner. Also, the tone correction of the pixels in a quadrilateral area surrounded by the face area vertex pixels 215, 217 and the outer face area vertex pixels 220, 222 is carried out in a similar manner.

The tone correction in the outer face area 219 is carried out according to the above described processing with reference to both of the gamma curve used for the tone correction of the face area 213, and the gamma curve used for the tone correction of the areas outside of the outer face area 219.

That is, in the tone correction processing on individual pixels inside of the outer face area 219 as pixels to be processed, the gamma curves decided by the local coefficient decision unit 105 and the face area coefficient decision unit 106 are applied with weights being attached thereto according to the coordinates of the pixels to be processed, respectively. As a result, it becomes possible to achieve a gradual change of the tone correction coefficient related to image processing in the vicinity of the boundary between the face area 213 and the areas outside of the outer face area 219.

As mentioned above, the image processing unit 107 carries out image processing according to each of the face area 213, the areas outside of the outer face area 219, and the outer face area 219, and outputs image data obtained by the image processing to the output unit 108. The output unit 108 outputs the image data, on which image processing has been carried out by the image processing unit 107, to an external display.

Figure 5:
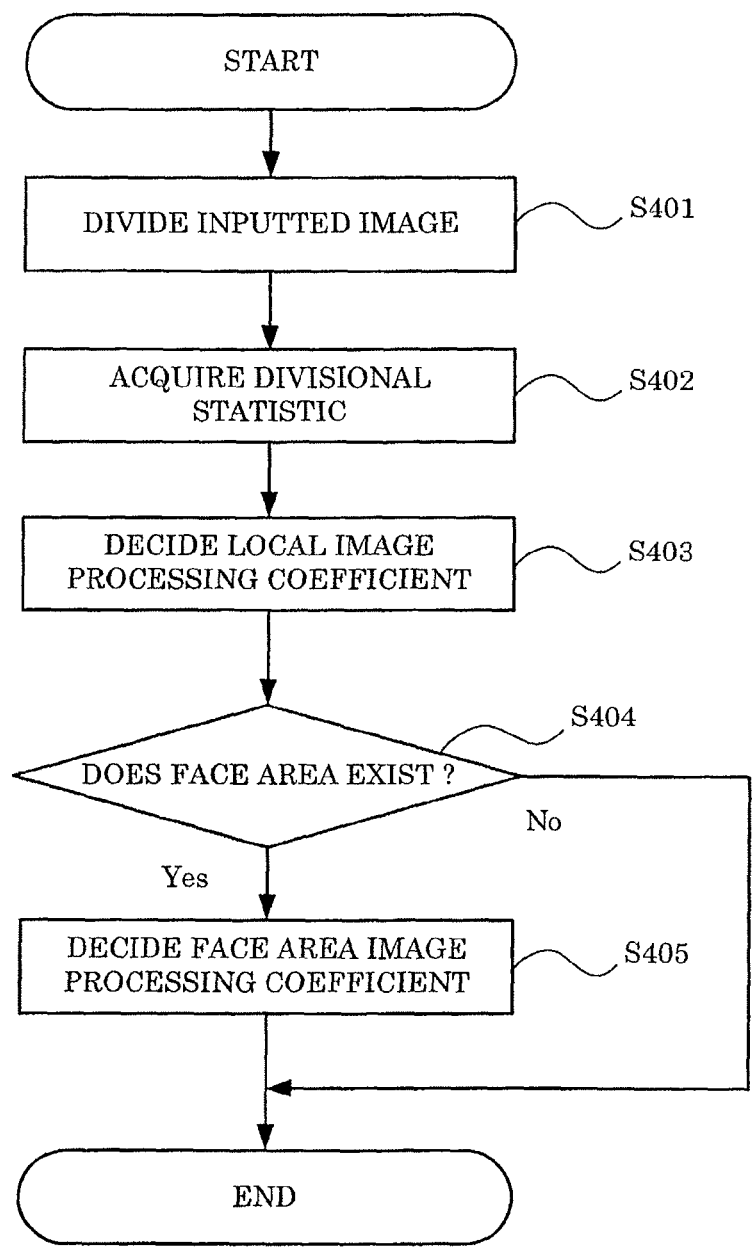
FIG. 5 is a flow chart of processing for deciding a tone correction coefficient in the first embodiment.
Figure 6:
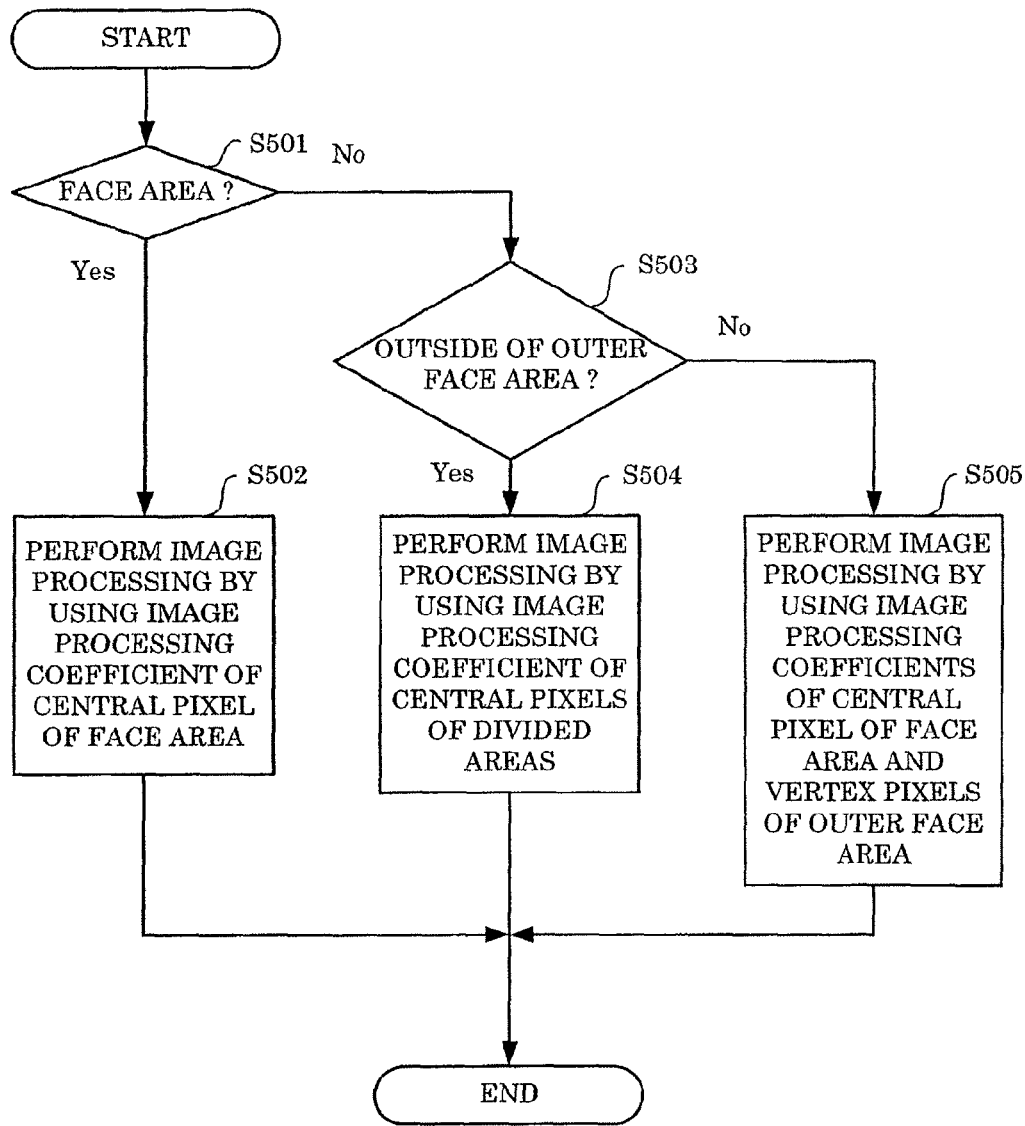
FIG. 6 is a flow chart of tone correction processing in the first embodiment.

FIG. 5 and FIG. 6 are flow charts showing image processing of this embodiment. First, based on FIG. 5, reference will be made to a flow to decide a gamma curve in the form of an image processing coefficient. An input image is divided by the division unit 103 (S401), and a divisional statistic is acquired by the divisional statistic acquisition unit 104 (S402), after which a gamma curve used for the tone correction of the central pixel of each of the divided areas is decided by the local coefficient decision unit 105 (S403).

At this time, in cases where a face area exists in the image (S404), the face area coefficient decision unit 106 further decides gamma curves to be used for the tone correction of a central pixel of the face area, and vertex pixels of an outer face area (S405).

Next, the flow of image processing will be explained by the use of FIG. 6. In cases where a pixel to be processed or subjected to image processing is one which exists in the face area (S501), the image processing unit 107 performs gamma conversion processing on that pixel by the use of the gamma curve used for the tone correction of the central pixel of the face area (S502).

In cases where a pixel to be processed is one which exists in an area outside of the outer face area (S503), gamma conversion processing is carried out on that pixel by the use of a gamma curve used for the tone correction of the central pixel of a corresponding divided area (S504).

In cases where a pixel to be processed or subjected to image processing is one which exists in the outer face area, gamma conversion processing is carried out on that pixel by the use of the gamma curve used for the tone correction of the central pixel of the face area and the gamma curves used for the tone correction of the vertex pixels of the outer face area (S505).

According to the above processing, it becomes possible to carry out uniform image processing on the face area while carrying out local image processing with respect to the areas other than the face area. As a result, it also becomes possible to prevent the viewers from being given an odd or uncomfortable feeling due to nonuniform image processing on the face area, without spoiling the effect of locally enhancing contrast or the effect of reducing extinction of tone in dark region and/or extinction of tone in bright region.

The image processing on pixels in the areas other than the face area (i.e., the outer face area and the area in the outside thereof) has been carried out by performing the weighted sum averaging of the results of gamma conversion carried out by the use of the gamma curves applied to the tone correction of the central pixels of the divided areas where the pixels being processed exist, and by the use of the gamma curves applied to the tone correction of the central pixels of their nearby divided areas.

On the other hand, the image processing on pixels in the areas other than the face area (i.e., the outer face area and the area in the outside thereof) may be carried out by performing gamma conversion only by the use of the gamma curves applied to the tone correction of the central pixels of the divided areas where the pixels being processed exist.

In this case, image processing on the pixels in the areas other than the face area is performed for each of the divided areas, so the processing is simplified. As mentioned above, an image processing coefficient is decided for each of the divided areas based on the statistic of the images in the divided areas, so even if simplified in this manner, local image processing can be carried out in the areas other than the face area.

Although an example in which one face area exists in image data has been described in this embodiment, even in cases where there exist a plurality of face areas, the present invention can be applied by performing similar processing with respect to each of the face area.

Figure 7:
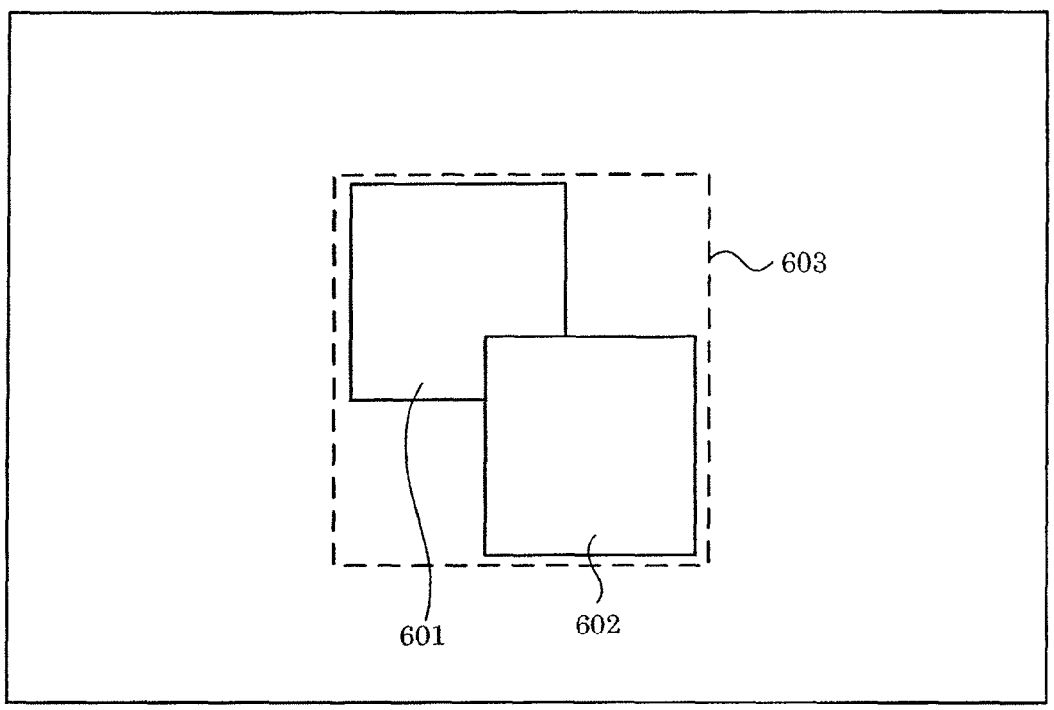
FIG. 7 is an example of a plurality of face areas overlapping each other and an inclusion area which includes them in the first embodiment.

Further, as shown in FIG. 7, even in cases where there exist a plurality of face areas and in cases where a plurality of face areas spatially overlap one another, the present invention can be applied. For example, the present invention can be applied by newly calculating a joint face area 603 (inclusion area) from overlapped face areas 601, 602, and carrying out the above-mentioned image processing on the joint face area.

At this time, the coordinates of an upper left vertex of the joint face area 603 are a combination of the smallest horizontal coordinate (x coordinate) and the smallest vertical coordinate (y coordinate) among horizontal coordinates (x coordinates) and vertical coordinates (y coordinates) of four face area vertices of each of the face areas 601, 602.

Also, the coordinates of a lower right vertex of the joint face area 603 are a combination of the largest horizontal coordinate (x coordinate) and the largest vertical coordinate (y coordinate) among horizontal coordinates (x coordinates) and vertical coordinates (y coordinates) of the four face area vertices of each of the face areas 601, 602.

It can be considered that information on such an inclusion area is not included in metadata. In that case, the face area information extraction unit 102 calculates inclusion area information based on each piece of face area information included in metadata. In addition, the image processing unit 107 may perform tone correction on the pixels in the areas other than the inclusion area by carrying out sum averaging of the gamma conversion results, which have been obtained by the use of the gamma curves decided by the local coefficient decision unit 105, while weighting them according to the coordinates of the pixels, similarly as described above.

Second Embodiment

The first embodiment is an embodiment which, in the case of existence of one or more face areas, makes the image processing coefficients which are used in the individual face areas uniform respectively. This second embodiment is an embodiment which makes the image processing coefficients used for the tone correction of pixels in a face area uniform, and which, in the case of existence of a plurality of face areas, makes image processing coefficients used for the tone correction of pixels in each face area common in the plurality of face areas. When this embodiment is applied, it becomes possible to carry out uniform image processing over the plurality of face areas which exist in image data.

A block diagram for an image processing apparatus in this embodiment is the same as that of FIG. 1. In addition, the contents of processing in the input unit 101, in the face area information extraction unit 102, in the division unit 103, in the divisional statistic acquisition unit 104, in the local coefficient decision unit 105, and in the output unit 108 are the same as those in the first embodiment.

The face area coefficient decision unit 106 carries out the same processing as in the first embodiment in cases where only one face area exists, but in the case of existence of a plurality of face areas, the face area coefficient decision unit 106 carries out processing for making the image processing coefficients used for the tone correction of pixels in each face area common in the plurality of face areas. This processing will be explained based on FIG. 8 and FIG. 9.

Figure 8:
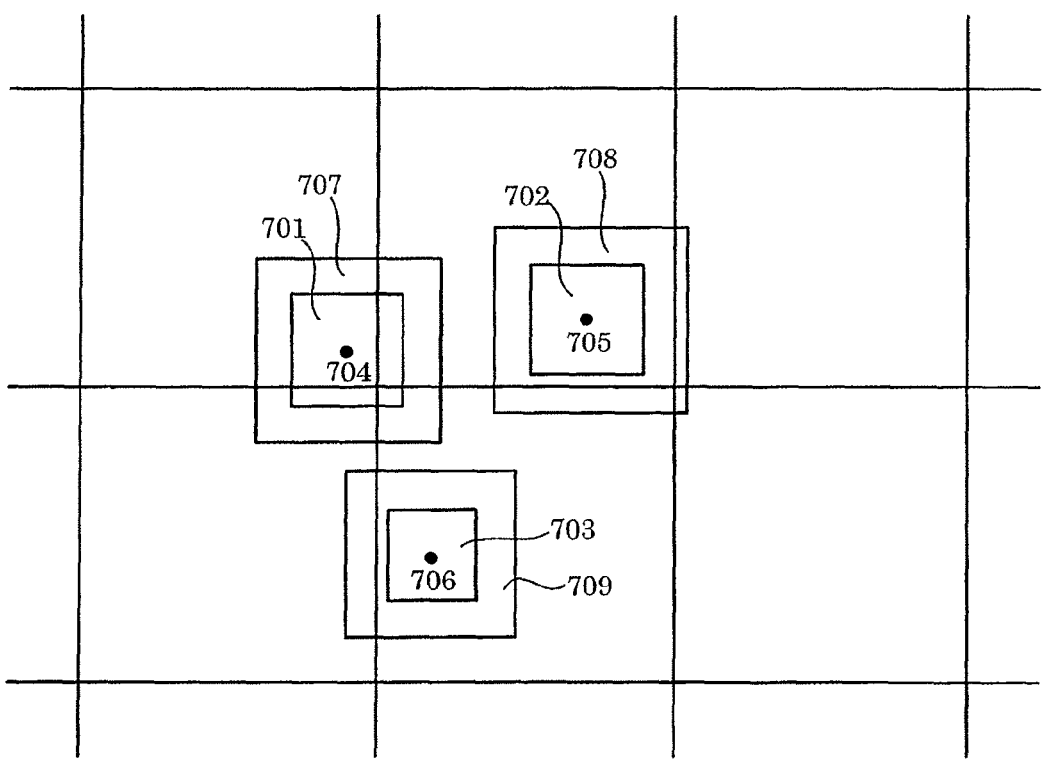
FIG. 8 is an example in which a plurality of face areas exist in the second embodiment.

FIG. 8 is a view showing, by way of example, a case where three face areas 701 through 703 are inputted from the face area information extraction unit 102 onto the six adjacent divided areas shown in FIG. 2. In addition, the pixels located at the centers of the three face areas 701 through 703, respectively, are represented as central pixels 704 through 706, respectively, and areas of a predetermined range, which are in touch with the outer peripheries of the individual face areas, respectively, are represented as outer face areas 707 through 709, respectively.

Figure 9:
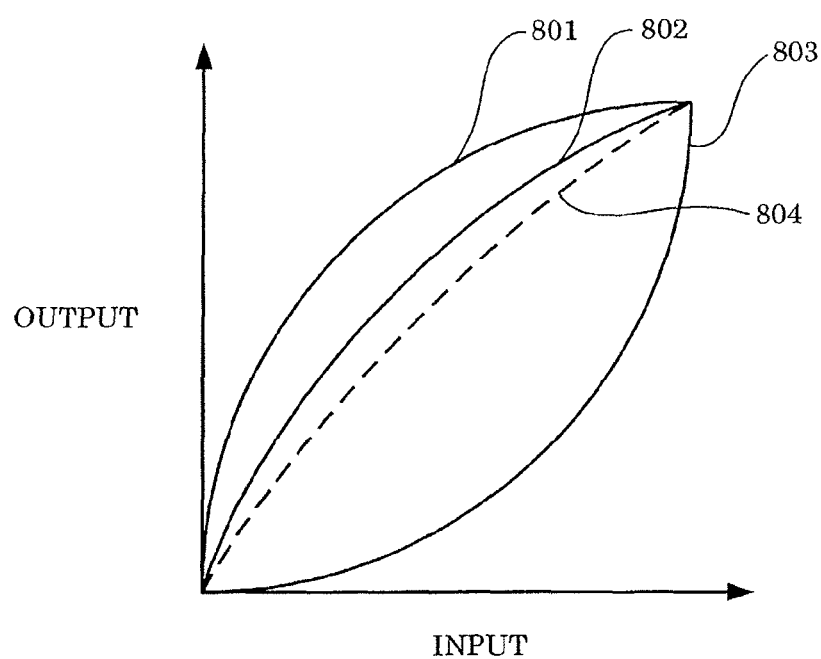
FIG. 9 is a view explaining the calculation of an average value of gamma curves in the second embodiment.

In addition, FIG. 9 shows gamma curves used for the tone correction of the three central pixels 704 through 706 as gamma curves 801 through 803, respectively. The gamma curves used for the tone correction of the individual central pixels are calculated by the method explained in the first embodiment.

First, the face area coefficient decision unit 106 calculates an average of the gamma curves used for the tone correction of the pixels in the individual face areas, in order to decide an image processing coefficient to be used in common in the tone correction of the pixels in the plurality of face areas. The gamma curves used for the tone correction of the pixels in the individual face areas 701 through 703 are the gamma curves used for the tone correction of the central pixels 704 through 706 of the individual face areas.

Accordingly, a gamma curve used in common in the tone correction of the pixels in the plurality of face areas is calculated by averaging the gamma curves 801 through 803 used for the tone correction of the central pixels 704 through 706 shown in FIG. 8 by the number of the face areas.

Here, note that the average gamma curve thus calculated is shown as a gamma curve 804 in FIG. 9. The face area coefficient decision unit 106 takes the gamma curve 804 calculated in the above-mentioned manner as a gamma curve which is used in common in the tone correction of the pixels in the plurality of face areas.

Then, the image processing unit 107 carries out the same image processing as in the first embodiment on individual areas including the face areas 701 through 703, areas outside of the outer face areas 707 through 709, and the outer face areas 707 through 709 in a sequential manner.

According to the above processing, it becomes possible to make the image processing coefficients used for the tone correction of the pixels in the plurality of face areas existing in the image data common, so it becomes possible to carry out uniform image processing over the plurality of face areas existing in the image data.

Here, note that in this embodiment, the local coefficient decision unit 105 decides the gamma curve to be used from the average brightness value, but a brightness histogram for each of the divided areas may be acquired by the divisional statistic acquisition unit 104, and the gamma curve may be decided according to information on the brightness histogram thus acquired.

In this embodiment, image processing should be performed by using the common image processing coefficient in all of the plurality of face areas existing in the image data. That is, one group is defined by all of the plurality of face areas, and tone correction processing has been performed by using the common image processing coefficient in all face areas belonging to the group.

In contrast to this, tone correction processing may be carried out by using a common image processing coefficient only in a part of the plurality of face areas. That is, a group may be defined by a part of the plurality of face areas, and tone correction processing can be performed by using the common image processing coefficient in all the face areas belonging to the group.

In this case, the face area coefficient decision unit 106 calculates intervals between the plurality of face areas based on the center coordinate information of the face areas inputted from the face area information extraction unit 102, and in cases where these intervals are each larger than a predetermined threshold, a common use of the image processing coefficient should not be made. The intervals between the face areas can be obtained, for example, by the distances between the center coordinates (representative points). That is, a group may be defined as a set of face areas between which the distances are equal to or less than the predetermined threshold, among the plurality of face areas.

Third Embodiment

The first embodiment and the second embodiment are ones in which local image processing and uniform image processing on a face area(s) are made compatible with each other with respect to image data to which information on an area(s) in which a face(s) exists has been added as metadata.

In this third embodiment, a specific object is detected by a photographing device such as a digital camera, etc., and image processing is carried out on image data to which information on the kind of the object and information on an area in which the object exists have been added as metadata. This embodiment achieves, in this image processing, compatibility between local image processing and uniform image processing on the object area.

Figure 10:
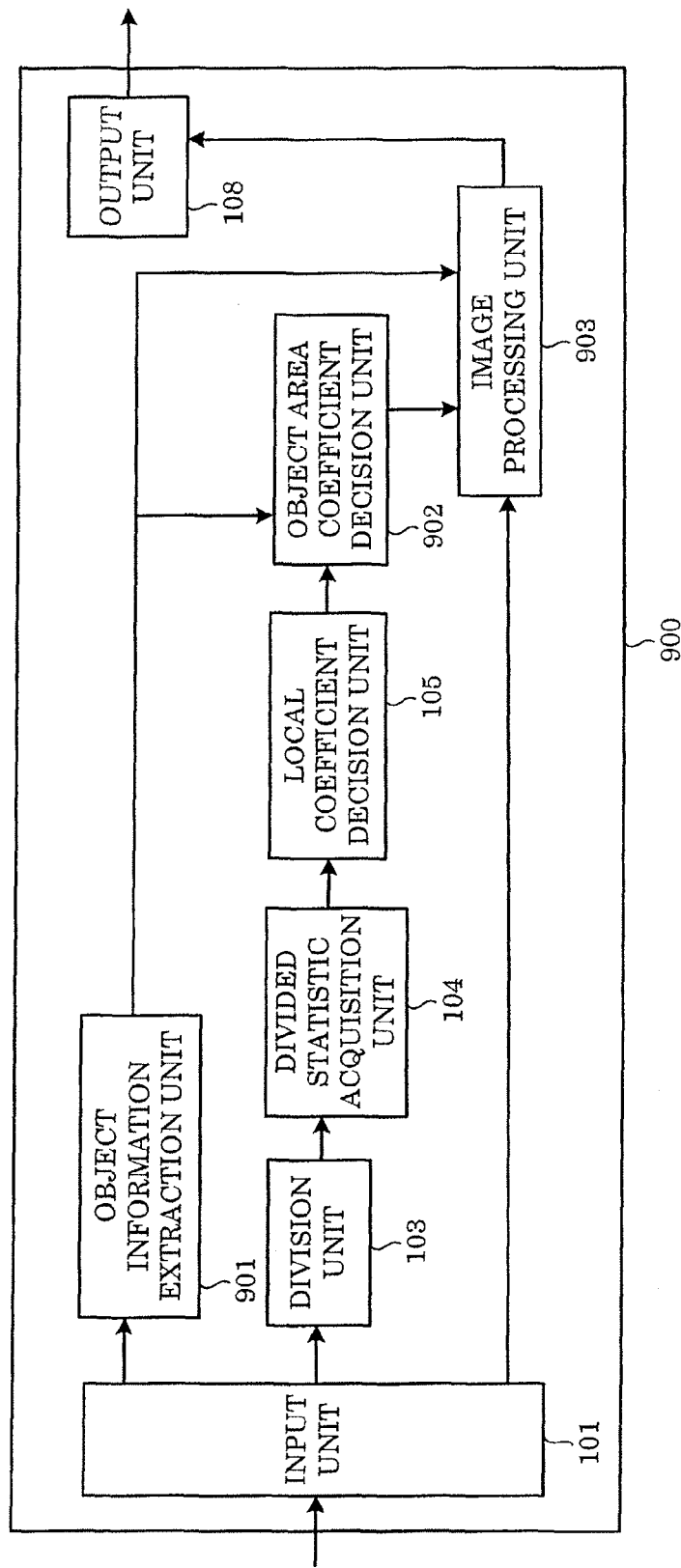
FIG. 10 is a block diagram of an image processing apparatus according to a third embodiment.

A block diagram for an image processing apparatus in this embodiment is shown in FIG. 10. In FIG. 10, an input unit 101, a division unit 103, a divisional statistic acquisition unit 104, a local coefficient decision unit 105, and an output unit 108 are the same as those in the first embodiment. Here, note that as the specific object, there can be listed objects such as, for example, the face of a pet such as a cat, a dog, etc., the entire body of a person, the entire body of a pet, a building that has been registered beforehand, etc. In addition, the information of the kind of an object to be described later is the information for identifying the kind of an object as listed in the above examples.

By making reference to the metadata of the image data inputted to the input unit 101, an object information extraction unit 901 first extracts the information on the kind of an object added to the image data and the information on the position (coordinates) of the object in which the object exists. Then, the object information extraction unit 901 determines whether the object thus extracted is a target on which uniform image processing is carried out.

This determination is made by recording beforehand a table, which describes the kinds of objects to be used as a target on which uniform image processing is carried out, in a storage unit (not shown), and by comparing the information on the kind of the object thus extracted and the table. As a result, in cases where the extracted object is a target on which uniform image processing is carried out, the object information extraction unit 901 outputs the coordinate information of the object to an object area coefficient decision unit 902.

The object area coefficient decision unit 902 performs the same processing as that of the face area coefficient decision unit 106 in the first embodiment except for that the "face area" in the processing of the face area coefficient decision unit 106 is replaced with "an area in which the object exists" and which is inputted from the object information extraction unit 901. An image processing unit 903 performs the same processing as that of the image processing unit 107 in the first embodiment except for that the "face area" in the processing of the image processing unit 107 is replaced with "an area in which the object exists" and which is inputted from the object information extraction unit 901.

According to the above processing, the specific object is detected by the photographing device such as a digital camera, etc., and it becomes possible to carry out suitable image processing on the image data to which information on the kind of the object and information on the area in which the object exists have been added as metadata. That is, image processing in which local image processing and uniform image processing to the object area are made compatible with each other becomes possible.

Here, note that in this embodiment, the object information extraction unit 901 determines, based only on the kind of the object as information for making a determination, whether uniform image processing is to be carried out, but the object information extraction unit 901 may perform such a determination based on the size, position and the like of the object as information for making a determination, in addition to the kind of the object.

In this case, a table which describes the relation among the kind, size, position and the like of the object used as a target on which uniform image processing is carried out has been beforehand recorded in the storage unit (not shown). Then, the object information extraction unit 901 should make a determination as to whether an object is a target on which uniform image processing is carried out, by comparing the information on the kind of the object and the coordinate information thereof with the table.

Here, note that the image processing apparatus of this embodiment is configured such that an image to which face area information has been added as metadata is inputted thereto, and the face area information is acquired from the metadata, but it may instead be configured such that it acquires face area information by receiving the input of an image having no metadata, and by carrying out face detection processing on that image.

In addition, although in the above embodiments, description has been made by taking, as an example, the image processing apparatuses which perform tone correction, the concept of the present invention can also be applied to, in addition to the image processing apparatuses performing tone correction, an image processing apparatus which carries out the image processing of changing the brightness and/or color of an image, for example. When such image processing is applied to a face area in a nonuniform manner, the brightness and color of a face will become nonuniform, so viewers may have an odd or uncomfortable feeling, but even in such a case, by applying the present invention, it is possible to perform such image processing on the face area in a uniform manner.

Moreover, the image processing can be locally carried out on areas other than the face area, so it also becomes possible to change the brightness and/or the color thereof in a local manner. In addition, although in the above embodiments, reference has been made to the configuration in which the tone correction coefficient for each of the divided areas is decided based on the brightness information of that divided area, it is also possible to decide the tone correction coefficient based on image information other than the brightness information, or based on the statistic of an image, etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-001310, filed on Jan. 6, 2010, and Japanese Patent Application No. 2010-221459, filed on Sep. 30, 2010, which are hereby incorporated by reference herein in their entirety.

What is claimed is:

1. An image processing apparatus comprising a processor that is configured to:
    input image data;
    determine a plurality of areas in an image corresponding to the image data, based on the image, said plurality of areas meeting respective predetermined conditions;
    determine a tone correction characteristic for each of the plurality of areas based on image characteristic corresponding to each of the plurality of areas;
perform tone correction processing to each of the plurality of areas by respectively using the tone correction characteristic corresponding to each of the plurality of areas; and
    output image data, in which the tone correction processing is performed, to a display unit, wherein
    the plurality of areas are different areas in the image, and
    the tone correction processing is performed in each of the plurality of areas by uniformly using the respective tone correction characteristics corresponding to the respective areas.

2. The image processing apparatus of claim 1, wherein the tone correction characteristic is a gamma coefficient.

3. The image processing apparatus of claim 1, wherein each of the plurality of areas is an area where a predetermined kind of object exists.

4. The image processing apparatus of claim 1, wherein the image characteristic is brightness.

5. The image processing apparatus of claim 1, the processor is configured further to:
    divide an input image based on the input image data into a plurality of divided images; and
    decide a tone correction characteristic for each of the divided images based on image characteristic of each of the plurality of divided images, wherein
    the processor is configured to determine the tone correction characteristic for each of the plurality of areas based on the tone correction characteristic of at least divided images which have a common portion with each of the plurality of areas.

6. The image processing apparatus of claim 1, wherein the image characteristic is histogram.

7. The image processing apparatus of claim 1, wherein the plurality of areas in the image changes in a case where the image changes.

8. An image processing apparatus comprising a processor that is configured to:
    input image data;
    determine a plurality of areas in an image corresponding to the image data, based on the image;
    respectively perform image correction processing to each of the plurality of areas based on image characteristic corresponding to each of the plurality of areas; and
output image data, in which the image correction processing is performed, to a display unit, wherein
    the processor is configured to respectively perform image correction processing to each of the plurality of areas,
    the plurality of areas are different areas in the image, and
    the image correction processing is performed in each of the plurality of areas by uniformly using the respective image correction characteristics corresponding to the respective areas.

9. The image processing apparatus of claim 8, wherein the image correction processing is a gamma correction processing.

10. The image processing apparatus of claim 8, wherein each of the plurality of areas is an image in which a predetermined kind of object exists.

11. The image processing apparatus of claim 8, wherein the image characteristic is brightness.

12. The image processing apparatus of claim 8, wherein the image characteristic is histogram.

13. The image processing apparatus of claim 8, wherein the plurality of areas in the image changes in a case where the image changes.

14. A control method for an image processing apparatus comprising:
    inputting image data;
    determining a plurality of areas in an image corresponding to the image data, based on the image, said plurality of areas meeting respective predetermined conditions;
    determining a tone correction characteristic for each of the plurality of areas based on image characteristic corresponding to each of the plurality of areas;
    performing tone correction processing to each of the plurality of areas by respectively using the tone correction characteristic corresponding to each of the plurality of areas; and
    outputting image data, in which the tone correction processing is performed to a display unit, wherein
    the plurality of areas are different areas in the image, and
    the tone correction processing is performed in each of the plurality of areas by uniformly using the respective tone correction characteristics corresponding to the respective areas.

15. The control method for an image processing apparatus of claim 14, wherein the tone correction characteristic is a gamma coefficient.

16. The control method for an image processing apparatus of claim 14, wherein each of the plurality of areas is an area where a predetermined kind of object exists.

17. The control method for an image processing apparatus of claim 14, wherein the image characteristic is brightness.

18. The control method for an image processing apparatus of claim 14, further comprising:
    dividing an input image based on the input image data into a plurality of divided images; and
    deciding a tone correction characteristic for each of the divided images based on image characteristic of each of the plurality of divided images, wherein
    in the determining the tone correction characteristic, the tone correction characteristic for each of the plurality of areas is determined based on the tone correction characteristic of at least divided images which have a common portion with each of the plurality of areas.

19. The control method for an image processing apparatus of claim 14, wherein the image characteristic is histogram.

20. The control method for an image processing apparatus of claim 14, wherein the plurality of areas in the image changes in a case where the image changes.

21. A control method for an image processing apparatus comprising:
inputting image data;
determining a plurality of areas in an image corresponding to the image data based on the image;
respectively performing image correction processing to each of the plurality of areas based on image characteristic corresponding to each of the plurality of areas; and
outputting image data, in which the image correction processing is performed, to a display unit, wherein
image correction processing is respectively performed to each of the plurality of areas, the plurality of areas are different areas in the image, and
the image correction processing is performed in each of the plurality of areas by uniformly using the respective image correction characteristics corresponding to the respective areas.

22. The control method for an image processing apparatus of claim 21, wherein the image correction processing is a gamma correction processing.

23. The control method for an image processing apparatus of claim 21, wherein each of the plurality of areas is an image in which a predetermined kind of object exists.

24. The control method for an image processing apparatus of claim 21, wherein the image characteristic is brightness.

25. The control method for an image processing apparatus of claim 21, wherein the image characteristic is histogram.

26. The control method for an image processing apparatus of claim 21, wherein the plurality of areas in the image changes in a case where the image changes.

* * * * *